United States Patent [19]

Marik et al.

[11] Patent Number: 5,354,075
[45] Date of Patent: Oct. 11, 1994

[54] KEYLESS DRILL CHUCK

[75] Inventors: Gregory C. Marik, Collierville; Raymond H. Roberson, Jr., Bartlett, both of Tenn.

[73] Assignee: Smith & Nephew Richards Inc., Memphis, Tenn.

[21] Appl. No.: 145,818

[22] Filed: Nov. 2, 1993

[51] Int. Cl.$^5$ .............................................. B23B 31/171
[52] U.S. Cl. .................................. 279/72; 279/30; 279/131; 279/902
[58] Field of Search ............... 279/22, 30, 75, 129, 279/131, 902, 72, 71

[56] References Cited

U.S. PATENT DOCUMENTS

| | | | |
|---|---|---|---|
| 1,130,716 | 3/1915 | Dressel. | |
| 1,168,540 | 1/1916 | Musselman. | |
| 2,069,527 | 2/1937 | Kirkland | 279/30 X |
| 2,405,772 | 8/1946 | Adams et al. | 10/135 |
| 3,398,965 | 8/1968 | Cox | 279/30 |
| 3,767,218 | 10/1973 | Linthicum et al. | 279/75 |
| 4,828,277 | 5/1989 | De Bastiani et al. | 279/1 SG |
| 5,171,312 | 12/1992 | Salyer | 606/81 |
| 5,171,313 | 12/1992 | Salyer | 606/86 |
| 5,192,292 | 3/1993 | Cezana et al. | 606/170 |
| 5,222,956 | 6/1993 | Waldron et al. | 606/80 |

*Primary Examiner*—Steven C. Bishop
*Attorney, Agent, or Firm*—Pravel, Hewitt, Kimball & Krieger

[57] ABSTRACT

A keyless drill chuck apparatus includes a tubular body having a longitudinal bore that includes first and second bore sections. The first bore section is of a smaller diameter and is closer to the proximal end portion of the drill, that end portion that is connected to a tool driver, motor or the like. The second bore section is larger diameter portion that is opened ended. A pair of bearing supports are positioned at the two bore sections. Each of the bearing holders carriers a plurality of conically-shaped bearing members. During use, a drill bit can be placed in either of the bore sections and into engagement with one of the selected sets of bearing. During use, different diameter drill bits and thus be placed as desired in the smaller or larger bore section and into engagement with the first or second set of bearing. Scalloped portions of the tool body adjacent each of the bores are provided in a corresponding number to the number of bearings. Each of the bearings registers in one of the scalloped portions. During use, rotational energy is transmitted between the tool body and the drill bit via the conical bearing. Each bearing bites into a scalloped portion and into the drill bit. Because of the scalloped portion provides a dished surface, the bite is greater as the drill attempts to rotate relative to the tool body.

20 Claims, 5 Drawing Sheets

KEYLESS DRILL CHUCK

BACKGROUND OF THE INVENTION

1. Field of the Invention

The present invention relates to drill devices and more particularly to an improved keyless drill chuck that can hold drill bits of different diameters. More particularly, the present invention relates to an improved drill chuck apparatus that can support cylindrically shaped drill bits of different diameters using a tubular support member having different internal diameters defining two bore sections for holding smaller and larger drill bits respectively and wherein a plurality of conically shaped members registers against the drill bit and against scalloped or dished portions of the tubular member wall to cam the drill when rotational energy is applied, thereby holding the drill securely with respect to the tubular member.

2. General Background

During surgical procedures, rotary drills are often used, and most frequently in the orthopedic surgical field. Power and hand drills desirably work with conventional cylindrically shaped drill bits rather than with some specialized drill bit that has external projections or non-typical configurations.

One of the problems with commercially available electric drills, hand drills and the like in the orthopedic surgical industry is that of lost time. During surgical operations, a large number of personnel are often involved in the procedure. The expense of surgical operations can be measured in the expense per minute, which can be staggering. It is extremely important to utilize the operating room time as effectively as possible. This is especially important when considering limited tourniquet time in many surgical operations, not to mention extreme cost of the operating room on a minute by minute basis. Therefore, it is important to eliminate lost time associated with changing surgical instruments, modifying instruments or selecting instruments.

During orthopedic surgical procedures, it is common to use "trial" members before selecting a particular prothesis, support member, bone plate, drill bit or the like. It is common for surgeon to select a number of drill bits for a particular procedure before deciding upon a final diameter drill bit in a given situation. Selection of an appropriate drill bit for a given surgical procedure is a problem that has long plagued the art.

The connecting and disconnecting of drills and reamers to motor drives, electrical drills, hand drills and the like is major time consuming exercise during actual surgery. Therefore, there is a need for a drill apparatus that will allow the surgeon to quickly connect drills and reamers to power equipment without significant time loss, thus decreasing the amount of time for the actual operation.

A number of patents have issued which relate to drill chucks. Two early patents are U.S. Pat. No. 1,130,716 issued to Dressel entitled "Dental Tool" and U.S. Pat. No. 1,168,540 issued to Musselman and entitled "Chuck". The Dressel device is defined as a dental tool that comprises a tubular two part casing having a detachable connection between the parts thereof. The device provides a readily adjustable means for attaching sand paper or emory discs or similar abrasive grinding or buffing elements to the chuck of a standard dental engine. The Musselman device shows a hand drill with a chuck that enables insertion and fastening of the object in the holder to be performed quickly, easily and effectively. The chuck apparatus disclosed in the Musselman patent includes a body having a tool socket the wall of which is provided with a longitudinal slot and a straight longitudinal outer surface surrounding the slot. An outer shell is secured to enclose the socketed part of the body and provide it internally with an inwardly inclined part opposite the slot of the body. A gripping member is mounted to move longitudinally in the slot and the gripping member can be moved positively within the slot from a position exterior of the shell.

U.S. Pat. No. 2,405,772 provides a structure for supporting a tap in fixed relation to a supporting head so that relative axial and rotative movements are prevented, together with a means for assuring a smooth and uniform feeding of the tap without excessive demands upon the tap for procuring the required axial movement of the work.

The Cox U.S. Pat. No. 3,398,965 entitled "Quick Change Tool Holder" relates to a tool holder that is adapted to permit readily release and removal of one tool and replacement with another and wherein they are firmly held in proper operating position. The apparatus includes a tool receding bushing as a sliding fit relative to an outer holder body. The inside of the holder body has a cylindrically shaped bore that receives the bushing in sliding relation. A coil spring urges the bushing to an outer position. To insert a new tool, the user pushes upon the bore of the bushing relative to the tool body. This inward movement moves a plurality of locking balls into a locking position. The bushing can be rotated until apertures align with holes and a locking ball is dropped through the hole into the aperture. The sleeve or bushing is then rotated so that the just inserted ball travels in a groove until the next aperture is a lined with the ball feeding hole and another ball dropped into position. This operation is continued until the balls have been placed in all of the apertures. The locking balls extend into the tool receiving bore to grip the tool during use.

Another patent that discusses the use of a plurality of balls to lock a drill bit in position is the Linthicum U.S. Pat. No. 3,767,218. The '218 patent describes a chuck with a set of circumferentially spaced locking balls for retaining a tool in a chuck in accurate alignment and providing a driving connection between the chuck and the tool. The drill bit provides a hexagonally shaped shank to be secured within the chuck during use.

A self-gradually locking chuck is the subject of U.S. Pat. NO. 4,828,277 issued to DeBastiani. The DeBastiani device provides a locking chuck for drills or similar devices and is particularly directed to portable drills used in surgery. It includes a cylindrical sleeve which can be coaxially fixed to a rotating shaft, a ferrule having a conical section provided internally with lobes, a cylindrical portion at one of its ends for engagement with the sleeve and a cylindrical portion at the other end. A first mounting, perforated longitudinally by a hole, includes a central portion having locking jaws which are movable in holes in a direction convergent upon the axis of the chuck and two second mountings opposite the central body. A spring centering device is provided. A cylindrical ferrule is threaded to a part of the first mounting as it projects from the first mentioned ferrule. The first mounting and ferrule move axially in relation to each other and relation to the cylindrical sleeve in which the ferrule can be releasably secured to the cylindrical ferrule by a retaining device. The second mountings are releasably secured to the sleeve by a retaining device.

A tool driver that includes a shaft, shank, flange, clamp, and a retainer is the subject of U.S. Pat. No. 5,171,312 issued to Salyer and entitled "Tool Driver". The shaft has a longitudinal axis and opposed ends. The shank is joined to one end of the shaft. The flange is joined to one end of the shaft. The shank is joined to one end of the shaft. The flange is joined to the other end of the shaft and has an outwardly facing flange surface extending from the shaft transversely to the axis. The clamp has a clamping surface facing the flange surface. The clamp is movable axially relative to the flange to vary the separation of the surfaces. The retainer is operatively connected to the clamp and is movable relative to the clamp between a first position and a second position. The retainer, in the first position precludes relative movement of the clamp and the flange.

A similar Salyer patent (U.S. Pat. No. 5,171,313), relates to a tool driver. The Salyer '313 patent provides a tool driver with a body having a longitudinal axis and opposite ends. A boss is positioned at one of the ends. A tool collet is positioned at the other of the ends. A plunger is positioned with in the bore of the body. The body has a pair of oppositely disposed pins at least one of the pins being movable in relation to the body in response to movement of the plunger. An actuator is positioned on and connected to the plunger. The actuator and plunger move as an unit axially of the body between an at rest position and a static position. One pin is movable between an extend position and a retroactive position as the plunger and actuator move between an at rest position and a static position, whereby a tool can be positioned on the driver when the plunger and actuator are in their static position and held in operatable position on the tool driver when the plunger and actuator are in their at rest position.

A surgical apparatus useable for arthroscopic surgery is the subject of U.S. Pat. No. 5,192,292 issued to H. Cezana, et al. The Cezana patent discloses a surgical apparatus particularly used for arthroscopic surgery and which includes a tool insertable into a hollow, powered hand piece. The tool includes a hollow housing in which a driven member is rotatably sleeved, which driven member is provided at its forward end with a material working portion of suitable surgical type. The tool housing and driven member adjacent to receive corresponding pin-like elements on the hand piece for respectively angularly fixing the tool housing and rotatively driving the driven member.

A surgical drill chuck is the subject of U.S. Pat. No. 5,222,956 issued to Waldron. The Waldron patent discloses a drill that uses burs with circular grooves about the circumference that are polygon shaped in cross section but curved along the length of the bur so as to accept locking balls therein. The burs slide within a tubular drive shaft that has transverse holes therein to guide the locking balls. A cylindrical cam surrounds the drive shaft and the locking balls to urge the balls radially inward into the bur groove. The cam is spring loaded axially. A spring loaded central pin within the drive shaft slides between the balls and urges the balls radially outward when no bur is inserted. A thumb button is used to disengage the balls surrounding cam.

Each of the above discussed patents relates generally to the concept of a drill bit support member or drill chuck. Some of the above patents discuss drill chucks that are keyless and that they do not require a common drill key to manually disengage the drill bit from the chuck.

SUMMARY OF THE PRESENT INVENTION

The present invention provides an improved keyless chuck apparatus that features a dual diameter section bore of a tool body. Each of the bore sections is capable of supporting a different diameter drill bit.

The apparatus of the present invention provides a tool housing that has proximal and distal end portions. The tool body has a tool body wall with an inner surface defining a cylindrical bore that extends from a position adjacent the proximal end of the tool body to the distal end thereof. The bore includes a smaller diameter section adjacent the proximal end which is a closed end portion of the bore. A larger diameter section of the bore is adjacent the distal end. The larger bore section is open ended.

A first smaller bearing holder fits the smaller diameter section of the bore. A second larger bearing holder fits the larger diameter section of the bore. A plurality of bearings, (preferably fustroconically shaped) are carried respectively in the first and second bearing holders. The tool body wall is provided with dished recesses adjacent each of the bearings.

The dish shaped recesses in combination with the fustroconical bearings define a camming arrangement that tightly grips the drill bit when the tool body is torqued relative to the drill. As a fustroconical bearing member rides up on and attempts to leave a dished portion, a bearing travels away from the inner wall of the tool housing and toward the drill bit, biting tightly into the drill bit.

A spring preloads the interface between each of the bearings, the drill bit, and the dished portion of the recesses.

Smaller diameter drill bits are gripped by bearings of the smaller bearing holder. Larger diameter drill bits are gripped by bearings of the larger bearing holder during use. The bearing holders provide central, generally cylindrically shaped opening for allowing the drill bit to extend therethrough. These openings in the bearing holders are preferably axially aligned and have central longitudinal axes that coincide with the central longitudinal axis of the tool body bore.

The larger bearing holder has a plurality of circumferentially spaced recesses, each sized a shaped to hold a bearing during use. Each bearing is aligned with and registers with a dished recess formed in the tool body inner wall. Likewise, the smaller bearing has a plurality of circumferentially spaced recesses, each sized and shaped to hold a bearing during use and each bearing registering with a dished recess formed on the wall of the tool body bore.

The dished recesses associated with the larger bearing member are formed on the larger diameter section of the bore. Likewise, the dished recesses associated with the smaller bearing holder are formed in the smaller diameter section of the bore.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

FIGS. 1-4 illustrate the preferred embodiment of the apparatus of the present invention, designated generally by the numeral 10. Keyless chuck apparatus 10 includes a main body 11 that is adapted to rotate during use when holding a conventional drill bit. Body 11 has a smaller diameter end portion 12 that can be connected to a drive motor or handle (not shown). Body 11 also has a larger diameter end portion 14 and an intermediate diameter central portion 15. Frustoconical section 13 joins small end portion 12 and central portion 15. Frustoconical section 16 joins central portion 15 and enlarged end portion 14.

Figures 6, 7, 8:
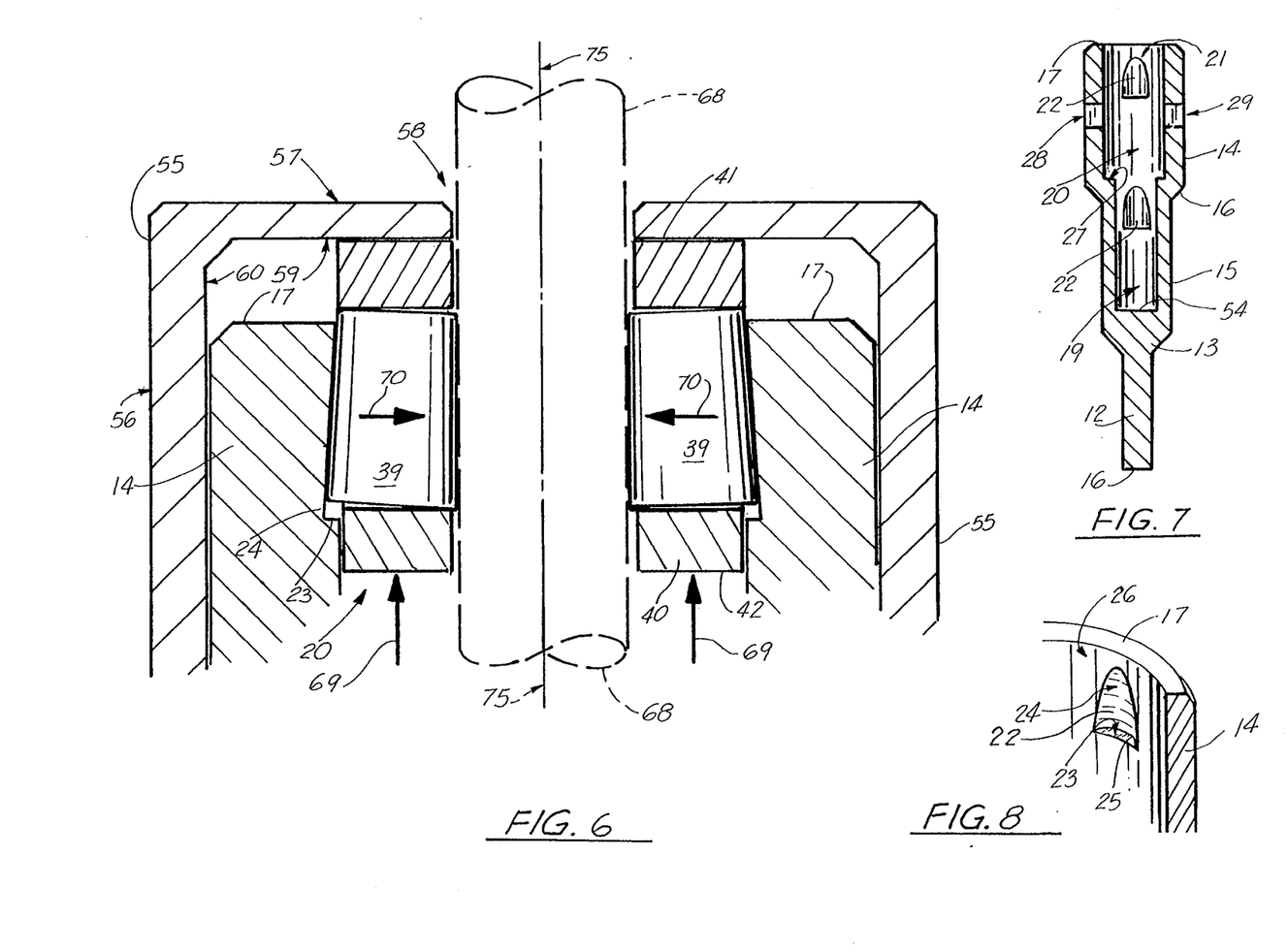
FIG. 6 is a partial sectional view of the preferred embodiment of the apparatus of the present invention.
FIG. 7 is another partial sectional view of the preferred embodiment of the apparatus of the present invention.
FIG. 8 is a fragmentary perspective view of the preferred embodiment of the apparatus of the present invention.

The main body 11 can be an integral structure comprised of smaller end portion 12, central portion 15, enlarged end portion 14 and frustoconical sections 13, 16. The end portions 17, 18 of body 11 include a proximal flat end portion 18 and an annular distal end portion 17. FIG. 7 shows body 11 in longitudinal cross section. The body 11 has an elongated bore 21 that comprises smaller cylindrical bore section 19 and larger cylindrical bore section 20. The bore 21 is open ended at one end, the annular end 17.

Each of the bores 19, 20 is provided with a plurality of circumferentially spaced recesses 22. The smaller bore 19 preferably has three recesses 22 spaced one hundred twenty degrees (120°) apart. Each recess 22 comprises dished surface 24 and flat transverse surface 23. The surface 24 intersects the surface 23 at curved edge 25. In transverse cross section (see FIG. 6) the surface 24 forms an acute angle with the longitudinal axis 75 of the tool body 11. The bore section 20 has preferably three recesses 22 spaced one hundred twenty degrees (120°) apart. During use, each recess 22 functions as a ramp or inclined surface that forces a bearing 39 into tight gripping engagement with a selected drill bit 68.

A pair of bearing holders 30, 40 are spaced longitudinally apart, the race 30 positioned at both bore sections 19, 20 and the race 40 being positioned at the larger bore section 20. Each of the races is sized and shaped to align with the plurality of recess 22.

Enlarged cylindrical end portion 14 has a pair of opposed slots 28, 29 that receive bar 65 upon assembly. These slots align with similar slots 32,33 on bearing holder 30. The two bearing holders include smaller bearing holder 30 and larger bearing holder 40. Washer 50 can be positioned behind the bearing holders 30, 40. Smaller bearing holder 30 fits within bores 19 and 20 stopping against coil spring 53 which abuts transverse surface 54. The larger bearing holder 40 normally occupies bore section 20.

Figure 1:
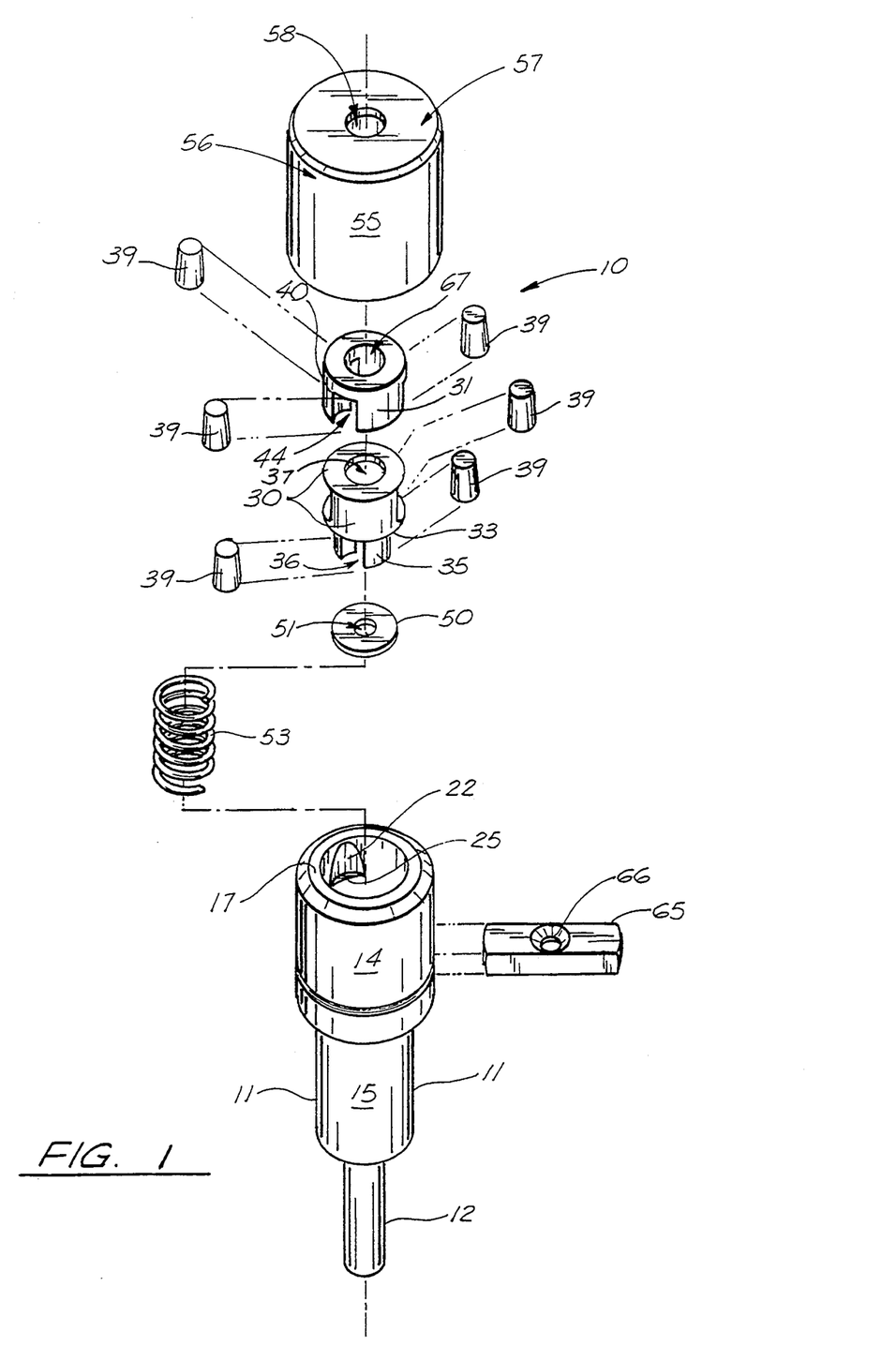
FIG. 1 an exploded perspective view of the preferred embodiment of the apparatus of the present invention.
Figure 2:
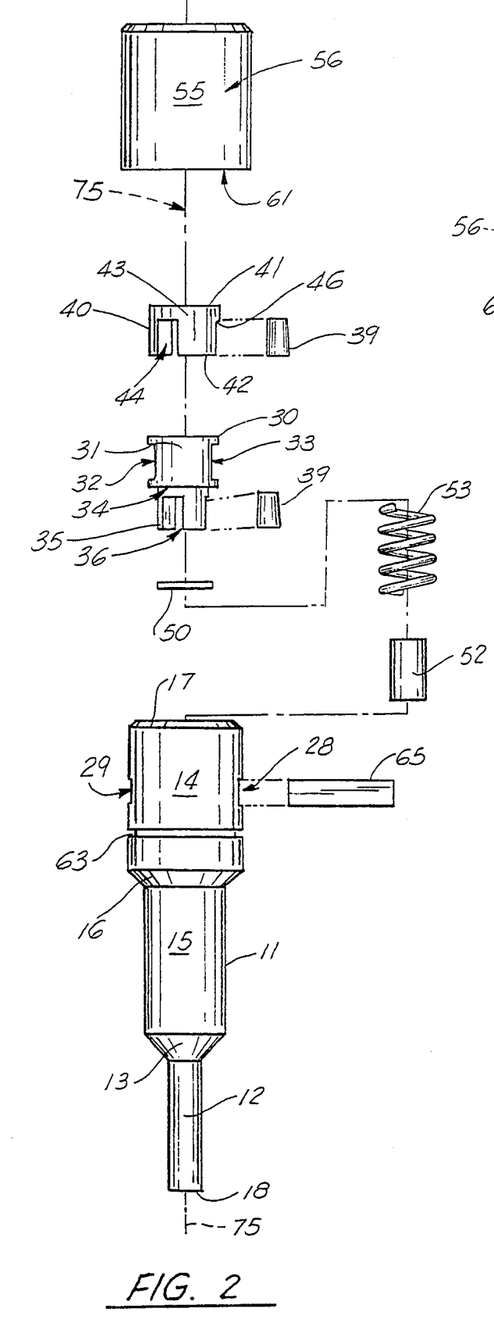
FIG. 2 is an exploded side view of the preferred embodiment of the apparatus of the present invention.
Figure 11:
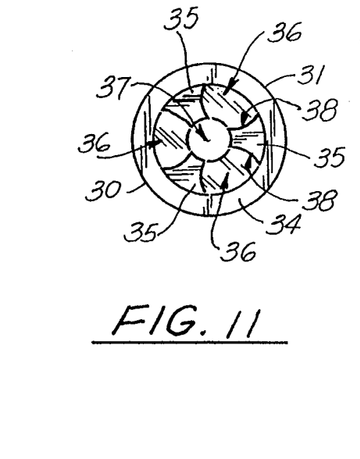

The bearing holder 30 includes a cylindrical portion 31 having a central longitudinal cylindrical bore 37. The bore 37 extends the full length of the bearing holder 30 and communicates with recess 36 between longitudinal posts 35. The longitudinal posts 35 surround the cylindrical bore 37 and communicate therewith. The posts 35 connect to cylindrical portion 31 at annular shoulder 34 as shown in FIG. 2. In FIG. 11, each of the posts 35 is shown as having conically shaped surfaces 38 that receive a similarly shaped corresponding frustroconical bearing 39.

Larger bearing holder 40 has end portions 41, 42. Bearing holder 40 also includes an outer cylindrically shaped wall 43. Three circumferentially spaced recesses 44 are positioned about bearing holder 40. Each of the recesses 44 is bounded by two curved surfaces 45. A central longitudinal cylindrical bore 67 extends through the bearing holder 40. The central longitudinal cylindrical bore 67 has a central longitudinal axis that is coincident with the central longitudinal axis 75 of apparatus 10.

Figure 9:
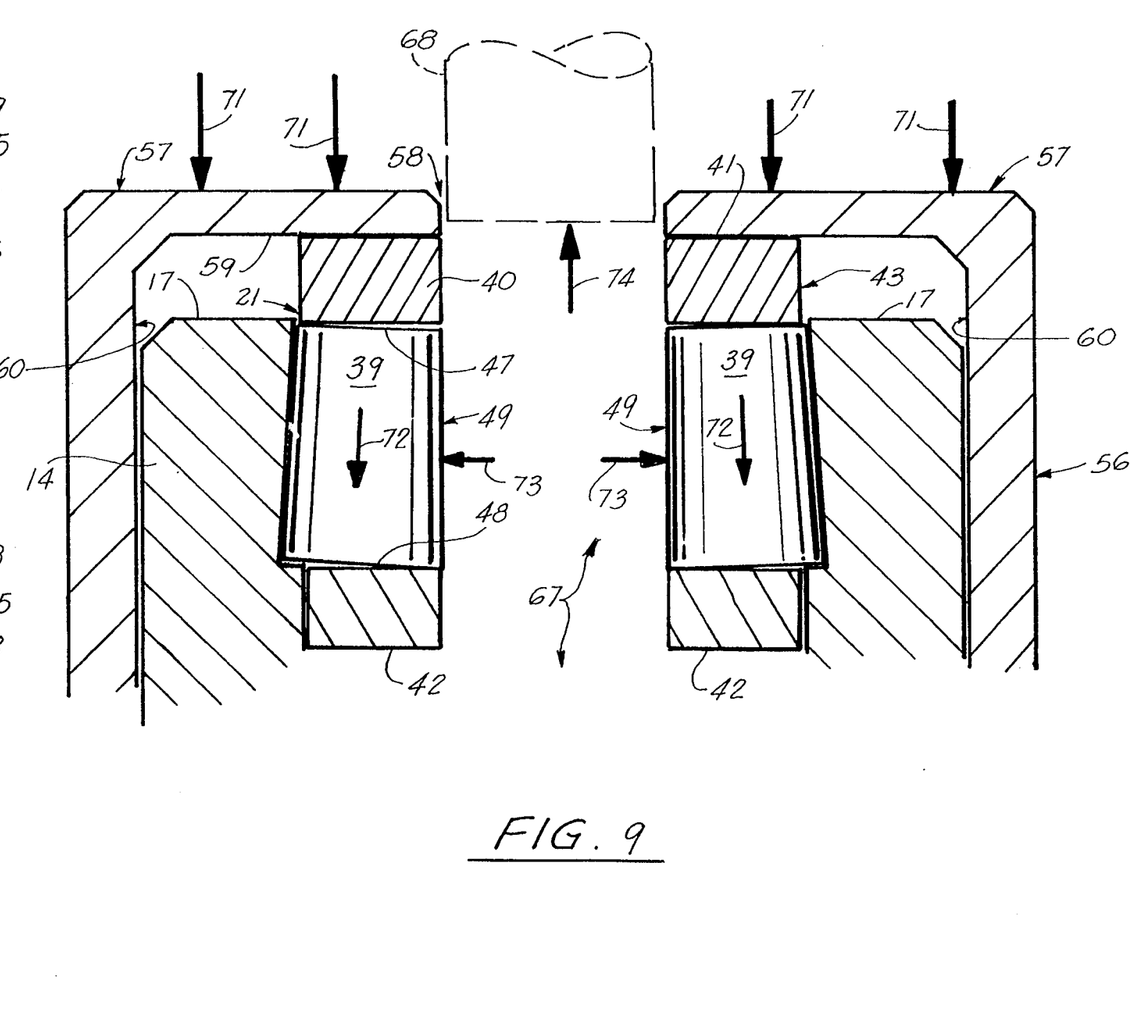

Each bearing 39 is frustroconical shaped bearing 39 has a smaller diameter flat circular end portion 47 and a larger diameter flat circular end portion 48 (see FIG. 9). Further, each frustoconical bearing 39 includes a conically shaped or curved outer surface 49. The radius of curvature of surface 24 is greater than the radius of curvature of surface 49.

Figure 5:
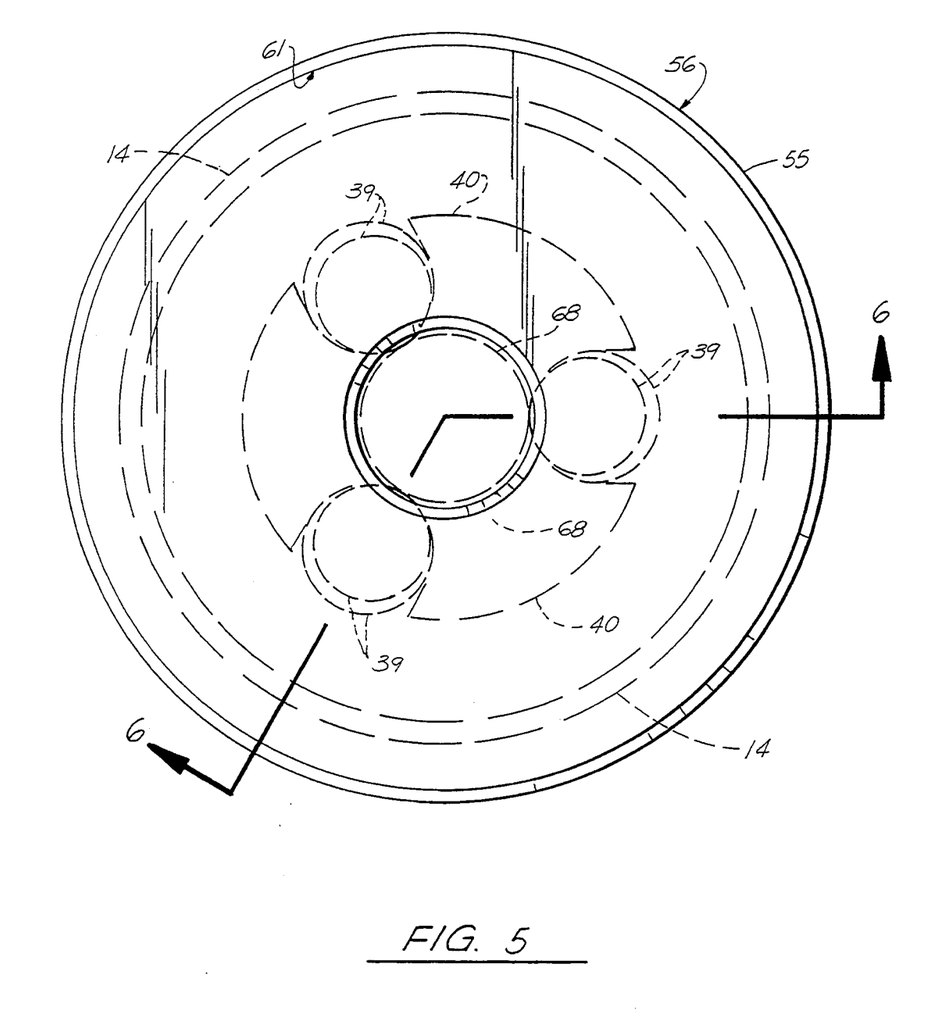
FIG. 5 is a schematic end view of the preferred embodiment of the apparatus of the present invention.

A plurality of flat surfaces 46 define bearing surfaces for receiving the smaller diameter flat end portions 47 of frustoconical bearing 39. Similarly, the conical surfaces 45 of bearing holder 40 register with the outer, conical surface 49 of bearing 39 as shown in FIGS. 5, 6, and 9.

Figure 3:
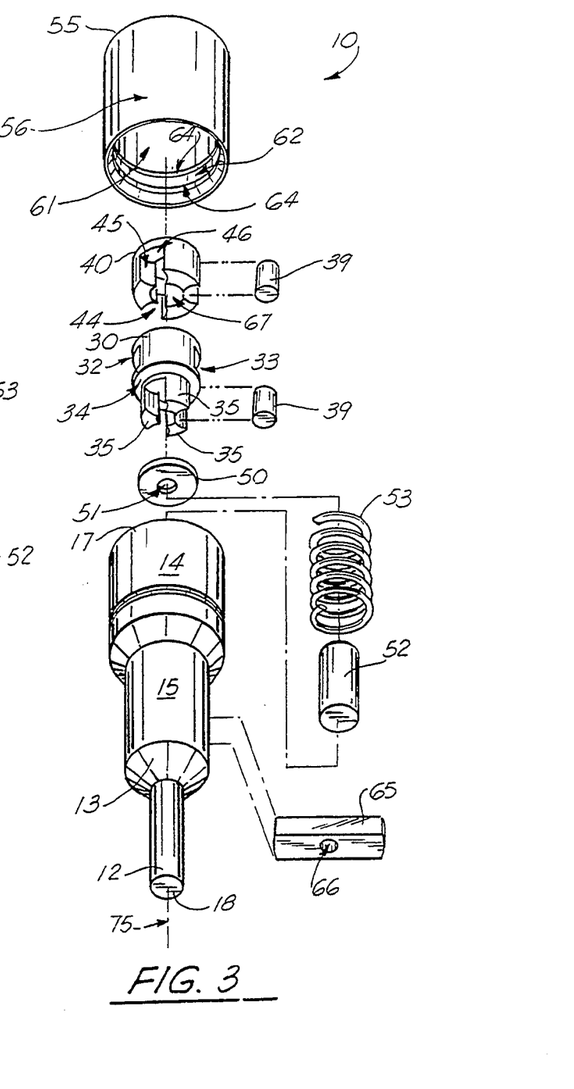
FIG. 3 is another exploded perspective view of the preferred embodiment of the apparatus of the present invention.
Figure 4:
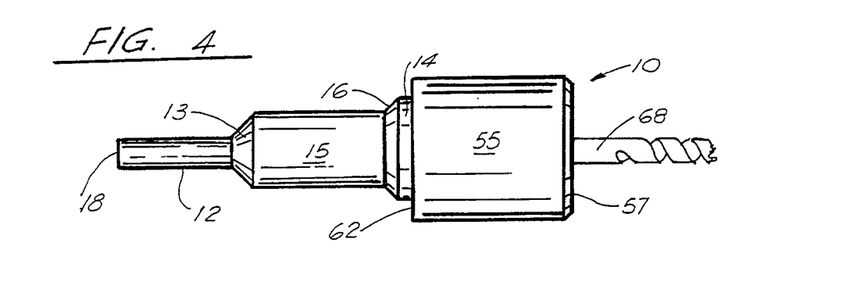
FIG. 4 is a side view of the preferred embodiment of the apparatus of the present invention.

Washer 50 can be positioned between smaller diameter bearing holder 30 and coil spring 53 (see FIGS. 2 and 3). Coil spring 53 bottoms against transverse stop 54. Cylinder 52 ca be used as a drill 68 depth stop within smaller bore section 19.

An enlarged cylindrically shaped, hollow chuck actuator 55 includes a cylindrically outer surface 56 and a circular generally flat end portion 57. End portion 57 has a circular opening 58 for receiving a drill bit 68 therethrough. Inside the hollow interior of actuator 55 is transverse surface 59 and cylindrical inner surface 60. The actuator 55 provides an open end portion 61 that receives section 14 of tool body 11.

Annular grooves 62, 63 upper body respectively on actuator 55 and tool body 11 for receiving annular rings (not shown) that limit the movement of actuator 55 relative to tool body 11. The annular groove 63 is a smaller thickness groove for holding an annular ring. The groove 62 is a larger thickness that allows the member 55 to move up and down between the limits of the thickness of groove 62. In FIG. 3, the numeral 64 indicates the end portions and therefore the limits of movement of annular groove 62.

Transverse peg 65 is used to assemble the apparatus 10. The peg 65 extends first through slot 28 then through the slots 32, 33 and finally through slot 29. This peg 65 can also act as a depth stop for a larger diameter drill 68. Slots 32, 33 are somewhat thicker than peg 65 so that bearing holder 30 can move linearly and in rotation in bore 21 responsive to pressure applied by actuator 55 and drill 68.

Because many varying and different embodiments may be made within the scope of the invention concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A keyless chuck apparatus for holding cylindrically shaped drill bits of different diameters, comprising:
   a) a tool housing that has proximal and distal end portions;
   b) the tool body having a tool body wall with an inner surface that defines a central longitudinal bore that extends from a position adjacent the proximal end of the tool body toward the distal end thereof, the bore including a smaller diameter section near said distal end and a larger diameter adjacent said proximal end;
   c) a first smaller bearing holder that registers the smaller diameter section of the bore;
   d) a second larger bearing holder that registers the larger diameter section of the bore;
   e) at least one bearing carried in the first and second bearing holders;
   f) cam means carried by the tool body wall at the inner surface for moving each of the bearings to grip the tool bit when the tool body is torqued relative to the tool bit;
   g) means for pre-loading the interface between each bearing and the tool bit;
   h) wherein smaller diameter tool bits are gripped by bearings of the smaller bearing holder and larger diameter tool bits are gripped by bearings of the larger bearing holder during use.

2. The apparatus of claim 1 wherein the bearing holders have central openings for receiving a tool.

3. The apparatus of claim 1 wherein the bearing holder openings are axially aligned.

4. The apparatus of claim 1 wherein the larger bearing holder has at least one circumferentially located recess, each sized and shaped to hold a bearing during use.

5. The apparatus of claim 1 wherein the smaller bearing holder has at least one circumferentially located recess, each sized and shaped to hold a bearing during use.

6. The apparatus of claim 1 wherein the smaller and larger bore sections are each generally cylindrically shaped.

7. The apparatus of claim 1 wherein the camming means comprises in part at least one circumferentially located recess positioned about the inner wall of the tool body, each recess having a transverse surface and a dished surface.

8. The apparatus of claim 7 wherein each dished surface includes a portion that is inclined relative to the central longitudinal axis of the tool body.

9. The apparatus of claim 8 wherein each of the bearings is frustroconically shaped, and each of the dished surfaces has a curved surface, and the curvature of each dished surface is greater than the curvature of the adjacent bearing.

10. A keyless chuck apparatus for holding cylindrically shaped tool bits of different diameters, comprising:
   a) a tool body that has proximal and distal end portions;
   b) the tool body having a tool body wall with an outer wall surface, and an inner wall surface that defines a central longitudinal bore that extends from a position adjacent the proximal end of the tool body toward the distal end thereof, the bore having a central longitudinal axis;
   c) at least one bearing holder that registers in the bore, said holder comprising an annular member with a central opening that coincides with the central longitudinal axis of the tool body bore during use;
   d) at least one bearing carried in the bearing holder;
   e) cam surface means carried by the tool body wall at the inner wall surface for moving the bearing to grip the tool bit when the tool body is moved relative to the tool bit, said cam surface means including a recess portion that includes an arcuate recess wall extending from the tool body wall inner surface toward the outer wall surface, the recess wall being sized and shaped to vary the recess thickness along a radial line;
   f) means for pre-loading the interface between the bearing and the tool bit, so that the bearing is biased to bear against the tool bit and the inner wall of the tool body at the cam surface means; and
   g) release means for disengaging the spring means so that a drill bit can be inserted into the tool body bore or removed therefrom.

11. The apparatus of claim 10 wherein each of the bearings is frustroconically shaped.

12. A keyless chuck apparatus for holding cylindrically shaped tool bits of different diameters, comprising:
   a) a tool body that has proximal and distal end portions;
   b) the tool body having a tool body wall with an inner surface that defines a central longitudinal bore that extends from a position adjacent the proximal end of the tool body toward the distal end thereof, the bore having a central longitudinal axis;
   c) at least one bearing holder that registers in the bore, said holder comprising an annular member with a central opening that coincides with the central longitudinal axis of the tool body bore during use;
   d) at least one bearing carried in the bearing holder;
   e) cam surface means carried by the tool body wall at the inner surface for moving the bearing to grip the tool bit when the tool body is moved relative to the tool bit;
   f) means for pre-loading the interface between the bearing and the tool bit, so that the bearing is biased to bear against the tool bit and the inner wall of the tool body at the cam surface means;
   g) release means for disengaging the spring means so that a drill bit can be inserted into the tool body bore or removed therefrom; and
   h) one of the bearing holders and the tool body each have a transverse slot therethrough, and further comprising a transverse peg member for insertion through the slots to hold the bearing member in a fixed position relative to the tool body end portions.

13. The apparatus of claim 12 wherein the peg member engages the smaller bearing holder during use.

14. The apparatus of claim 12 wherein the peg member has an opening for allowing a tool bit to extend through the peg.

15. The apparatus of claim 10 wherein the release means is manually operable.

16. The apparatus of claim 15 wherein the release means comprises a member movably supported at the proximal end of the tool body between gripping and releasing portions.

17. The apparatus of claim 16 wherein the release means is urged into the gripping position by the spring means.

18. The apparatus of claim 16 wherein the release means is an annular member having a curved surface and a transverse surface.

19. The apparatus of claim 18 wherein the transverse surface has an opening that registers with the tool bit being held.

20. The apparatus of claim 1 further comprising release means for releasing a tool that is being gripped by the bearings.

* * * * *

UNITED STATES PATENT AND TRADEMARK OFFICE
CERTIFICATE OF CORRECTION

PATENT NO. : 5,354,075
DATED : Oct. 11, 1994
INVENTOR(S) : Gregory C. Marik, Raymond H. Roberson, Jr.

It is certified that error appears in the above-identified patent and that said Letters Patent is hereby corrected as shown below:

Column 5, line 20, insert

--FIG. 9 is a partial sectional view of the preferred embodiment of the apparatus of the present invention.

Figure 10:
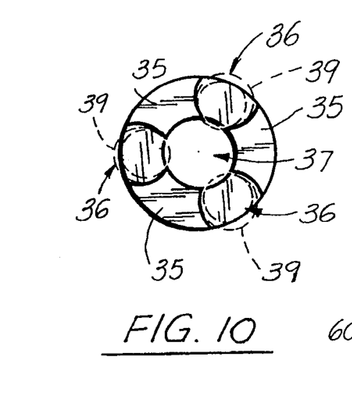

FIGS. 10-11 are fragmentary views of the preferred embodiment of the apparatus of the present invention illustrating the bearing holder and the bearing portions thereof.--

Signed and Sealed this

Twenty-sixth Day of March, 1996

Attest:

BRUCE LEHMAN

*Attesting Officer*     *Commissioner of Patents and Trademarks*